US009641801B2

(12) United States Patent
Chen et al.

(10) Patent No.: US 9,641,801 B2
(45) Date of Patent: May 2, 2017

(54) METHOD, APPARATUS, AND SYSTEM FOR PRESENTING COMMUNICATION INFORMATION IN VIDEO COMMUNICATION

(71) Applicant: Huawei Technologies Co., Ltd., Shenzhen (CN)

(72) Inventors: Zichong Chen, Shenzhen (CN); Yin Zhao, Hangzhou (CN); Pei Lv, Shenzhen (CN); Jiong Zhou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 14/830,057

(22) Filed: Aug. 19, 2015

(65) Prior Publication Data
US 2016/0065895 A1 Mar. 3, 2016

(30) Foreign Application Priority Data

Sep. 2, 2014 (CN) .......................... 2014 1 0445414

(51) Int. Cl.
  *H04N 7/14* (2006.01)
  *H04N 7/15* (2006.01)
  (Continued)

(52) U.S. Cl.
  CPC .......... *H04N 7/15* (2013.01); *G06K 9/00335* (2013.01); *G06T 7/70* (2017.01); *H04L 65/1096* (2013.01); *H04L 65/403* (2013.01); *H04S 7/40* (2013.01)

(58) Field of Classification Search
  CPC ... G06K 9/00335; G06T 7/004; G06T 7/2086; G06T 7/2093; G06T 2200/28;
  (Continued)

(56) References Cited

U.S. PATENT DOCUMENTS 6,611,281 B2 * 8/2003 Strubbe .................... H04N 7/15
  348/14.01
6,744,460 B1 * 6/2004 Nimri ................. H04L 12/1827
  348/14.07

(Continued)

FOREIGN PATENT DOCUMENTS

CN 101039409 A 9/2007
EP 1705911 A1 9/2006

OTHER PUBLICATIONS

Schmidt, "Multiple Emitter Location and Signal Parameter Estimation," IEEE Transactions on Antennas and Propagation, vol. AP-34, Issue 3, pp. 276- 280, Institute of Electrical and Electronics Engineers, New York, New York (Mar. 1986).

(Continued)

*Primary Examiner* — Hemant Patel
(74) *Attorney, Agent, or Firm* — Leydig, Voit & Mayer, Ltd.

(57) ABSTRACT

Embodiments of the present invention provide a method for presenting communication information in video communication, including: controlling collection of audio information and video information of a video communication site; determining a position of a speaker in the video communication site according to the audio information, where the speaker is a person of participants in the video communication site that speaks; acquiring speech video information from the video information according to the position of the speaker, where the speech video information is video information of the speaker within a speaking period; and controlling presentation of the speech video information.

19 Claims, 10 Drawing Sheets

(51) Int. Cl.
*H04L 29/06* (2006.01)
*G06K 9/00* (2006.01)
*H04S 7/00* (2006.01)
*G06T 7/70* (2017.01)

(58) Field of Classification Search
CPC . G06T 2207/10016; G06T 2207/20144; G06T 2207/30196; G06T 2207/30232; G06T 2210/62; H04S 7/40; H04N 5/2226; H04N 9/3188
USPC .... 348/14.01–14.16; 370/259–271, 351–357
See application file for complete search history.

(56) References Cited

U.S. PATENT DOCUMENTS

| | | | | |
|---|---|---|---|---|
| 7,099,448 | B1* | 8/2006 | Laniepce | H04M 1/578 379/202.01 |
| 7,298,930 | B1 | 11/2007 | Erol et al. | |
| 7,598,975 | B2* | 10/2009 | Cutler | G06K 9/00295 348/14.06 |
| 7,768,543 | B2* | 8/2010 | Christiansen | H04L 29/06027 348/14.08 |
| 8,300,556 | B2* | 10/2012 | Kalipatnapu | H04L 12/1822 370/260 |
| 8,319,819 | B2 | 11/2012 | Macdonald et al. | |
| 8,406,608 | B2* | 3/2013 | Dubin | H04N 7/147 386/278 |
| 8,558,868 | B2* | 10/2013 | Prentice | H04N 7/147 235/377 |
| 8,630,854 | B2 | 1/2014 | Marvit | |
| 8,842,161 | B2* | 9/2014 | Feng | H04N 5/23219 348/14.08 |
| 8,848,020 | B2* | 9/2014 | Abate | H04L 12/1822 348/14.01 |
| 8,966,095 | B2* | 2/2015 | Mostafa | H04L 65/4084 709/227 |
| 9,083,848 | B2* | 7/2015 | Ok | H04N 7/15 |
| 2003/0054802 | A1 | 3/2003 | Xie | |
| 2004/0254982 | A1* | 12/2004 | Hoffman | H04L 29/06027 709/204 |
| 2005/0099492 | A1* | 5/2005 | Orr | H04L 12/1827 348/14.08 |
| 2006/0092269 | A1* | 5/2006 | Baird | H04L 12/1822 348/14.08 |
| 2006/0098085 | A1* | 5/2006 | Nichols | H04M 1/72544 348/14.07 |
| 2007/0070177 | A1* | 3/2007 | Christensen | H04N 7/15 348/14.01 |
| 2008/0312923 | A1* | 12/2008 | Crinon | H04M 3/569 704/246 |
| 2010/0085415 | A1* | 4/2010 | Rahman | G01S 3/80 348/14.08 |
| 2011/0093273 | A1 | 4/2011 | Lee et al. | |
| 2012/0127262 | A1* | 5/2012 | Wu | H04N 7/152 348/14.09 |
| 2013/0162752 | A1* | 6/2013 | Herz | H04N 7/15 348/14.08 |
| 2014/0085404 | A1* | 3/2014 | Kleinsteiber | H04N 7/15 348/14.08 |

OTHER PUBLICATIONS

Bai et al., "Video SnapCut: Robust Video Object Cutout Using Localized Classifiers," ACM SIGGRAPH (2009).

* cited by examiner

METHOD, APPARATUS, AND SYSTEM FOR PRESENTING COMMUNICATION INFORMATION IN VIDEO COMMUNICATION

CROSS-REFERENCE

This application claims priority to Chinese Patent Application No. 201410445414.5, filed on Sep. 2, 2014, which is hereby incorporated by reference in its entirety.

TECHNICAL FIELD

The present invention relates to the field of communications, and in particular, to a method, an apparatus, and a system for presenting audio and video information in video communication.

BACKGROUND

In existing communications technologies for videoconferencing, a display device in a site of one party usually displays all attendees in a site of another party. If there are a large number of attendees in the site of the another party, the display device displays too many people and cannot emphasize a person that is speaking.

Therefore, it is necessary to research and develop a communication method and system to overcome the defect.

SUMMARY

According to a first aspect, an embodiment of the present invention provides a method for presenting communication information in video communication, including: controlling collection of audio information and video information of a video communication site; determining a position of a speaker in the video communication site according to the audio information, where the speaker is a person of participants in the video communication site that speaks, and the multiple participants are multiple people that participate in the video communication; acquiring speech video information from the video information according to the position of the speaker, where the speech video information is video information of the speaker within a speaking period; and controlling presentation of the speech video information.

In a first possible implementation manner of the first aspect, the controlling collection of audio information and video information of a video communication site includes: controlling multiple collection devices to collect the audio information and the video information, where each collection device of the multiple collection devices includes one audio collection module and one video collection module, a position of the video collection module relative to the audio collection module is preset, the audio collection module collects audio information of one or more participants in the multiple participants, the video collection module collects video information of the one or more participants, the audio information, of the one or more participants in the multiple participants, collected by the audio collection module constitutes a line of audio information in the audio information, and the video information of the one or more participants collected by the video collection module constitutes a line of video information in the video information; the determining a position of a speaker in the video communication site according to the audio information includes: using a line of audio information, of which the volume is maximal, the volume exceeds a volume threshold, and duration that the volume exceeds the volume threshold exceeds a time threshold, in the audio information as sound information of the speaker; and determining according to the sound information of the speaker, a position of the speaker relative to the audio collection module that collects the sound information of the speaker; and the acquiring speech video information from the video information according to the position of the speaker includes: determining according to the position of the speaker relative to the audio collection module that collects the sound information of the speaker and the position of the video collection module, which collects video information of the speaker, relative to the audio collection module that collects the sound information of the speaker, a position of the speaker relative to the video collection module that collects the video information of the speaker; identifying images, of the one or more participants, in the line of video information collected by the video collection module that collects the video information of the speaker, and recording positions of the images, of the one or more participants, relative to the video collection module that collects the video information of the speaker; determining, according to the position of the speaker relative to the video collection module that collects the video information of the speaker and the positions of the images, of the one or more participants, relative to the video collection module that collects the video information of the speaker, an image of the speaker in the line of video information collected by the video collection module that collects the video information of the speaker; and extracting, from the line of video information collected by the video collection module that collects the video information of the speaker, the image of the speaker within the speaking period.

In a second possible implementation manner of the first aspect, the controlling collection of audio information and video information of a video communication site includes: controlling one collection device to collect the audio information and the video information, where the collection device includes one audio collection module and one video collection module, a position of the audio collection module relative to the video collection module is preset, the audio collection module collects the audio information, the audio information is audio information of the multiple participants, the video collection module collects the video information, and the video information is video information of the multiple participants; the determining a position of a speaker in the video communication site according to the audio information includes: determining a position of the speaker relative to the audio collection module according to the audio information; and the acquiring speech video information from the video information according to the position of the speaker includes: determining, according to the position of the speaker relative to the audio collection module and a position of the video collection module relative to the audio collection module, a position of the speaker relative to the video collection module; identifying images of the multiple participants in the video information, and recording positions of the images, of the multiple participants, relative to the video collection module; determining, according to the position of the speaker relative to the video collection module and the positions of the images, of the multiple participants relative to the video collection module, an image of the speaker in the video information; and extracting the image of the speaker within the speaking period from the video information.

With reference to any possible implementation manner of the first possible implementation manner and the second possible implementation manner of the first aspect, in a third possible implementation manner, the audio collection module is a microphone array, where the microphone array includes at least two microphones.

With reference to the first aspect or any one of the first to the second possible implementation manners of the first aspect, in a fourth possible implementation manner, the controlling presentation of the speech video information includes: controlling real-time presentation of the speech video information.

With reference to the first aspect or any one of the first to the second possible implementation manners of the first aspect, in a fifth possible implementation manner, the controlling presentation of the speech video information includes: controlling recording of the speech video information; and controlling presentation of the recorded speech video information after the speaking period expires.

With reference to the fifth possible implementation manner of the first aspect, in a sixth possible implementation manner, the method further includes: if the volume of the speaker is lower than a minimum-volume threshold, and duration that the volume of the speaker is lower than the minimum-volume threshold is longer than a maximum-time threshold, determining that the speaking period expires; or if a speech end signal is received, determining that the speaking period expires.

With reference to any possible implementation manner of the fifth possible implementation manner and the sixth possible implementation manner of the first aspect, in a seventh possible implementation manner, the controlling presentation of the speech video information further includes: generating a record icon corresponding to the speech video information, and the controlling presentation of the recorded speech video information after the speaking period expires include: controlling, according to a received signal indicating whether the record icon is touched, start or stop of playback of the speech video information.

With reference to the seventh possible implementation manner of the first aspect, in an eighth possible implementation manner, the method further includes: controlling, according to the received signal indicating whether the record icon is touched, start or stop of playback of at least one type of information in the following information: speech audio information and text information corresponding to the speech audio information, where the speech audio information is audio information within the speaking period in the audio information.

With reference to any possible implementation manner of the fifth possible implementation manner of the first aspect, the sixth possible implementation manner of the first aspect, and the seventh possible implementation manner of the first aspect, in a ninth possible implementation manner, the method further includes: forbidding real-time presentation of speech audio information and the speech video information within the speaking period, where the speech audio information is audio information within the speaking period in the audio information.

With reference to the first aspect, or any possible implementation manner of the first possible implementation manner of the first aspect, the second possible implementation manner of the first aspect, the third possible implementation manner of the first aspect, and the fourth possible implementation manner of the first aspect, in a tenth possible implementation manner, the controlling presentation of the speech video information includes: controlling recording of the speech video information; receiving indication information, where the indication information is used to indicate a time range of speech video information to be played; and controlling presentation of the speech video information within the time range.

According to a second aspect, an embodiment of the present invention provides an apparatus for presenting communication information in video communication, including: a collection control module, configured to control one or more collection devices to collect audio information and video information of a video communication site; a determining module, configured to determine a position of a speaker in the video communication site according to the audio information, where the speaker is a participant of multiple participants that speaks within a speaking period, and the multiple participants are multiple people that participate in the video communication; an acquiring module, configured to acquire speech video information from the video information according to the position of the speaker, where the speech video information is video information of the speaker within the speaking period; and a presentation control module, configured to control presentation of the speech video information.

In a first possible implementation manner of the second aspect, there are multiple collection devices, each collection device of the multiple collection devices includes one audio collection module and one video collection module, a position of the video collection module relative to the audio collection module is preset, the audio collection module collects audio information of one or more participants in the multiple participants, the video collection module collects video information of the one or more participants, the audio information of the one or more participants collected by the audio collection module constitutes a line of audio information in the audio information, the video information of the one or more participants collected by the video collection module constitutes a line of video information in the video information; the determining module includes: a selection module, configured to use a line of audio information, of which the volume is maximal, the volume exceeds a volume threshold, and duration that the volume exceeds the volume threshold exceeds a time threshold, in the audio information as sound information of the speaker; and an audio position determining module, configured to determine, according to the sound information of the speaker, a position of the speaker relative to the audio collection module that collects the sound information of the speaker; and the acquiring module includes: a video position determining module, configured to determine, according to the position of the speaker relative to the audio collection module that collects the sound information of the speaker and the position of the video collection module, which collects video information of the speaker, relative to the audio collection module that collects the sound information of the speaker, a position of the speaker relative to the video collection module that collects the video information of the speaker; an image identification module, configured to identify images, of the one or more participants, in the line of video information collected by the video collection module that collects the video information of the speaker, and record positions of the images, of the one or more participants, relative to the video collection module that collects the video information of the speaker; an image determining module, configured to determine, according to the position of the speaker relative to the video collection module that collects the video information of the speaker and the positions of the images, of the one or more participants, relative to the video collection module that collects the video information of the speaker, an image of the speaker in the line of video information collected by the video collection module that collects the video information of the speaker; and an image extracting module, configured to extract, from the line of video information collected by the video collection module that collects the video information of the speaker, the image of the speaker within the speaking period.

In a second possible implementation manner of the second aspect, the one collection device includes one audio collection module and one video collection module, a position of the audio collection module relative to the video collection module is preset, the audio collection module collects the audio information, the audio information includes audio information of the multiple participants, the video collection module collects the video information, the video information includes video information of the multiple participants; the determining module is configured to determine a position of the speaker relative to the audio collection module according to the audio information; and the acquiring module includes: a video position determining module, configured to determine, according to the position of the speaker relative to the audio collection module and a position of the video collection module relative to the audio collection module, a position of the speaker relative to the video collection module; an image identification module, configured to identify images of the multiple participants in the video information, and record positions of the images, of the multiple participants, relative to the video collection module; an image determining module, configured to determine, according to the position of the speaker relative to the video collection module and the positions of the images, of the multiple participants relative to the video collection module, an image of the speaker in the video information; and an image extracting module, configured to extract the image of the speaker within the speaking period from the video information.

With reference to the first possible implementation manner and the second possible implementation manner of the second aspect, in a third possible implementation manner, the audio collection module is a microphone array, where the microphone array includes at least two microphones.

With reference to the second aspect or any one of the first to the third possible implementation manners of the second aspect, in a fourth possible implementation manner, the presentation control module is configured to control real-time presentation of the speech video information.

With reference to the second aspect or any one of the first to the third possible implementation manners of the second aspect, in a fifth possible implementation manner, the presentation control module includes: a recording module, configured to record the speech video information; and a record presentation control module, configured to control presentation of the recorded speech video information after the speaking period expires.

With reference to the fifth possible implementation manner of the second aspect, in a sixth possible implementation manner, the presentation control module further includes: a speech end determining module, configured to determine, in a case in which the volume of the speaker is lower than a minimum-volume threshold, and duration that the volume of the speaker is lower than the minimum-volume threshold is longer than a maximum-time threshold, that the speaking period expires; or configured to determine, in a case in which a speech end signal is received, that the speaking period expires.

With reference to any one of the fifth or the sixth possible implementation manners of the second aspect, in a seventh possible implementation manner, the recording module is further configured to generate a record icon corresponding to the speech video information, and the record presentation control module is configured to control, according to a received signal indicating whether the record icon is touched, start or stop of playback of the speech video information.

With reference to the seventh possible implementation manner of the second aspect, in an eighth possible implementation manner, the record presentation control module is further configured to control, according to the received signal indicating whether the record icon is touched, start or stop of playback of at least one type of information in the following information: speech audio information and text information corresponding to the speech audio information, where the speech audio information is audio information within the speaking period in the audio information.

With reference to any one of the fifth to the seventh possible implementation manners of the second aspect, in a ninth possible implementation manner, the presentation control module further includes a real-time presentation forbidding module, configured to forbid real-time presentation of the speech audio information and the speech video information, where the speech audio information is audio information within the speaking period in the audio information.

With reference to the fifth possible implementation manner of the second aspect, in a tenth possible implementation manner, the record presentation control module includes: a time receiving module, configured to receive indication information, where the indication information is used to indicate; and an information presentation control module, configured to control presentation, within the time range, of at least one type of the following information: the speech video information, speech audio information, and text information corresponding to the speech audio information, where the speech audio information is audio information within the speaking period in the audio information.

According to a third aspect, an embodiment of the present invention provides a system for presenting communication information in video communication, including: the apparatus according to the second aspect or any one of the first to the tenth possible implementation manners of the second aspect; a collection device, configured to collect the audio information and the video information under the control of the apparatus; and a terminal device, configured to present the speech video information under the control of the apparatus.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Embodiment 1

Figure 1:
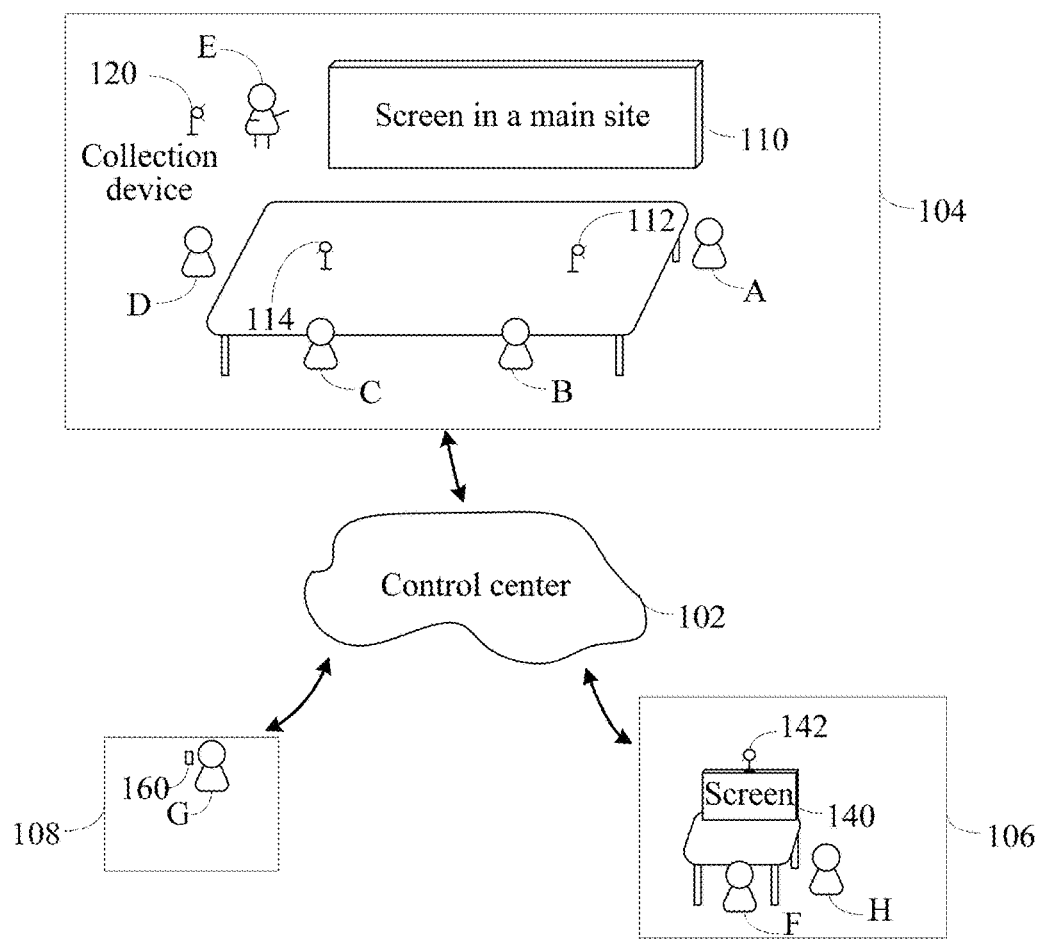
FIG. 1 is a schematic diagram of an application scenario of video communication Embodiment 1 of the present invention.

FIG. 1 is a schematic diagram of an application scenario of video communication a first embodiment of the present invention.

The application scenario of the video communication is a video conference. The video conference is held among a main site 104, a branch site 106, and a branch site 108. A video conference system includes a control center 102. The control center 102 controls transfer and sharing of information such as audio information, video information, and conference materials among the main site 104, the branch site 106, and the branch site 108. The main site 104 has a lecturer E and attendees A to D, and includes a terminal device (for example, a screen, a loudspeaker and a keyboard) 110 (the loudspeaker and the keyboard are not shown in the figure) and collection devices 112, 114, and 120. The branch site 106 has attendees E and F, and includes a terminal device (for example, a notebook computer) 140 and a collection device 142. The branch site 108 has an attendee G, and includes a terminal/collection device (for example, a mobile phone) 160. In an embodiment, the lecturer and the attendees are all participants. In another embodiment, the lecturer is a presenter, and the attendees are participants. The collection devices 112, 114, 120, 142, and 160 collect video information and audio information of the lecturer and the attendees. Each collection device includes a video collection module and an audio collection module, for example, a camera and a microphone array. The video collection module is configured to collect video information. The audio collection module is configured to collect audio information. The terminal devices 110, 140, and 160 present the video information and audio information, and receive a signal input by the lecturer or the attendees.

The control center 102 controls the collection device 120 in the main site 104 to collect video information and audio information of the lecturer E in the main site 104. The control center 102 controls the collection device 112 in the main site 104 to collect video information and audio information of the attendees A and B in the main site 104, controls the collection device 114 in the main site 104 to collect video information and audio information of the attendees C and D in the main site 104, controls the collection device 142 in the branch site 106 to collect video information and audio information of the attendees F and H in the branch site 106, and controls the collection device 160 in the branch site 108 to collect video information and audio information of the attendee G in the branch site 108. The control center 102 controls the collection devices to upload the video information and audio information, collected by the collection devices, to the control center 102.

The control center 102 may identify a speaker according to the collected video information and audio information, and extract, from the video information, video information that only includes the speaker, and present, on terminals in the main site or the branch sites, the video information that only includes the speaker. For example, if the attendee C in the main site 104 speaks, the control center 102 controls separate presentation of the video information, which only includes the attendee C that speaks, on the terminal device 110 in the main site 104, the terminal device 140 in the branch site 106, and the terminal device 160 in the branch site 108. If the attendee F in the branch site 106 speaks, the control center 102 controls separate presentation of the video information, which only includes the attendee F that speaks, on the terminal device 110 in the main site 104, the terminal device 140 in the branch site 106, and the terminal device 160 in the branch site 108. If the attendee G in the branch site 108 speaks, the control center 102 controls, in a similar manner, presentation of corresponding video information.

Because only video information of the speaker in the attendees rather than video information of all the attendees is presented, an attendee that watches the video information can easily concentrate on the speaker rather than other attendees.

The control center 102 also controls the collection device 120 in the main site 104 to upload, to the control center 102, the video information, of the lecturer, collected by the collection device 120. In an embodiment, no matter whether the lecturer in the main site 104 speaks or not, the control center 102 further controls presentation of the collected video information, of the lecturer, on the terminal device 110, the terminal device 140, and the terminal device 160. In another embodiment, only when the lecturer in the main site 104 speaks, the control center 102 controls presentation of the collected video information, of the lecturer, on the terminal device 110, the terminal device 140, and the terminal device 160.

The control center 102 controls, presentation on the terminal devices 110, 140, and/or 160, of audio information collected by the collection devices 112, 114, and 120 in the main site 104, the collection device 142 in the branch site 106, and the collection device 160 in the branch site 108. In an embodiment, the control center 102 first performs audio mixing processing on the audio information collected by the collection devices in the sites, and then presents, on the terminal devices 110, 140, and/or 160, the audio information that has undergone the audio mixing processing.

Embodiment 2

Figure 2:
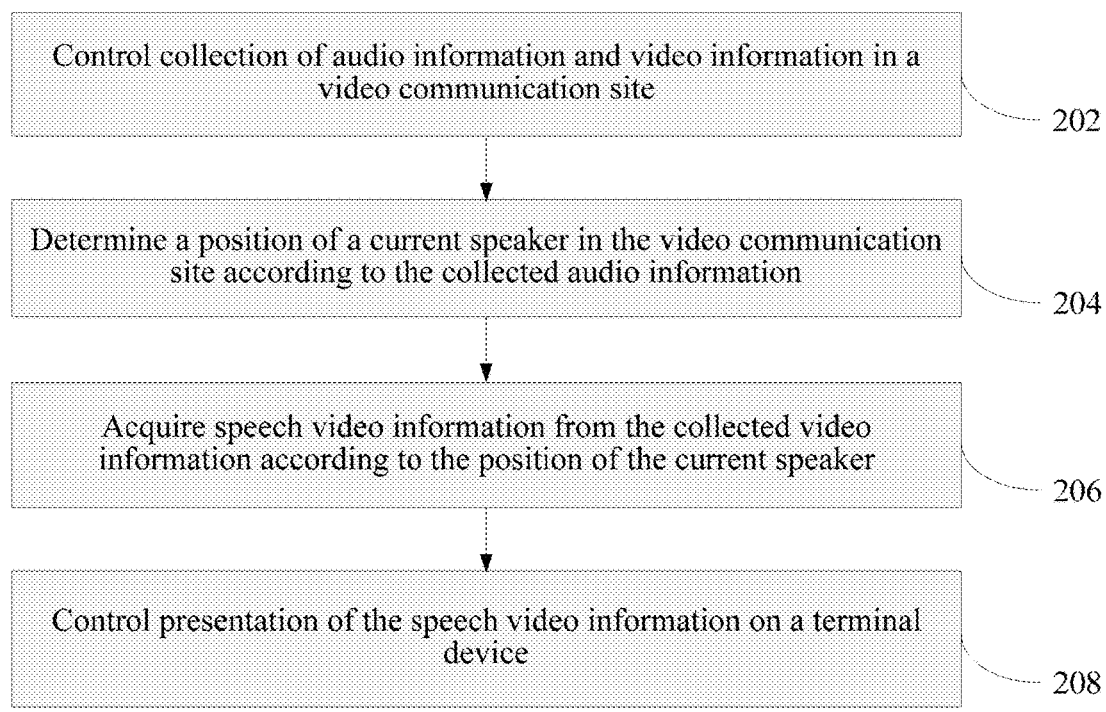
FIG. 2 is a schematic flowchart of a method for presenting communication information in video communication according to Embodiment 2 of the present invention.

FIG. 2 is a schematic flowchart of a method for presenting communication information in video communication according to a second embodiment of the present invention. The method includes:

In step S202, a control center 102 controls collection of audio information and video information in a video communication site (for example, a main site 104, and branch sites 106 and/or 108).

In step S204, the control center 102 determines a position of a speaker in the video communication site according to the collected audio information. The speaker is a person of participants in the video communication site that speaks.

In step S206, the control center 102 acquires speech video information from the collected video information according to the position of the speaker, where the speech video information is video information of the speaker within a speaking period.

In step S208, the control center 102 controls presentation of the speech video information on a terminal device (for example, a terminal device 110 in the main site 104, a terminal device 140 in the branch site 106 and/or a terminal device 160 in the branch site 108).

In an embodiment, the control center 102 controls real-time presentation of the speech video information on the terminal devices 110, 140, and/or 160. For example, when an attendee C in the main site 104 is the speaker, the control center 102 controls real-time presentation of a part of speech video information, which includes an image of the attendee C, on the terminal devices 110, 140, and/or 160.

In another embodiment, the control center 102 controls recording of the speech video information, and controls presentation of the recorded speech video information on the terminal devices 110, 140, and/or 160 after the speaking period expires. Specifically, the control center 102 records the speech video information, generates a record icon corresponding to the speech video information, and after the speaking period expires, controls, according to a received signal indicating whether the record icon is touched, start or stop of playback of the speech video information corresponding to the record icon. Furthermore, in an embodiment, the control center 102 further controls, according to the received signal indicating whether the record icon is touched, start or stop of playback of at least one type of information in the following information: the speech video information corresponding to the record icon, speech audio information, and text information corresponding to the speech audio information. The speech audio information is audio information within the speaking period in the collected audio information in the video communication site.

The text information is, for example, a text record of the speech audio information. Therefore, an attendee may reexamine content of video communication.

In an embodiment, a manner for determining that the speaking period expires is: if the volume of the speaker is lower than a minimum-volume threshold, and duration that the volume of the speaker is lower than the minimum-volume threshold is longer than a maximum-time threshold, determining that the speaking period expires; or if a speech end signal, for example, a speech end signal from the terminal device 110, 140 or 160, is received, determining that the speaking period expires.

In an embodiment, in a process that another attendee speaks, the speaker may perform an operation on the terminal device 110, 140 or 160 to turn on a silent speech mode. In the silent speech mode, within the speaking period that the speaker speaks, the control center 102 forbids real-time presentation of the speech audio information and speech video information of the speaker, on each terminal device. The speech audio information is audio information within the speaking period in the collected audio information in the video communication site. Specifically, in an embodiment, the speaker performs an operation on a terminal device to turn on the silent speech mode and starts to speak. After accepting the operation of the speaker to turn on the silent speech mode, the terminal device sends a silent speech mode turn-on signal to the control center 102. The control center 102 forbids, according to the received silent speech mode turn-on signal, real-time presentation of the speech audio information and speech video information of the speaker on each terminal device, and at the same time controls a collection device, which collects sound information of the speaker, to record a speech of the speaker. After the speech ends, the speaker performs an operation on the terminal device 110, 140 or 160 to turn off the silent speech mode. After accepting the operation of the speaker to turn off the silent speech mode, the terminal device sends a silent speech mode turn-off signal to the control center 102. The control center 102 generates a record icon according to the received silent speech mode turn-off signal, so that an attendee may control, by touching the record icon, playback of the recorded speech of the speaker in the silent speech mode.

In an embodiment, on an information transmission path between each collection device in collection devices 112, 114, 120, 142, and 160 and the control center 102, a switch is set, so that when the switch is closed, the information transmission path is connected, and under the control of the control center 102, the video information and audio information collected by the collection device may be uploaded to the control center 102, and when the switch is opened, the information transmission path is disconnected, and the video information and audio information collected by the collection device cannot be uploaded to the control center 102. The switch is controlled by a silent speech mode signal. When the silent speech mode is turned on, under the control of the silent speech mode signal, within the speaking period that the speaker speaks, the switch is opened, the video information and audio information collected by the collection device cannot be uploaded to the control center 102, and the local collection device records the collected video information and audio information. After the silent speech mode is turned off, when the switch is closed, the recorded video information and audio information are uploaded to the control center 102, and the video information and audio information collected by the collection device may be uploaded to the control center 102. Therefore, the speaker may record speech of the speaker without interrupting a speech of another attendee that speaks, and each attendee may reexamine, after a speech of the attendee ends, the speech of the attendee by operating a corresponding record icon.

In an embodiment, an attendee may input a time range by using the terminal device 110, 140 or 160, and input a corresponding command to obtain information in video communication within the time range. Specifically, the control center 102 records the speech video information, receives the time range sent from the terminal device 110, 140 or 160, and controls presentation of at least one type of the following received information within the time range: speech video information, speech audio information and text information corresponding to the speech audio information.

In an embodiment, an attendee may input a specified signal by using the terminal device 110, 140 or 160 to obtain information, of an attendee in video communication, indicated by the specified signal. Specifically, after the speaking period expires, the control center 102 receives the specified signal from the terminal device 110, 140 or 160. The specified signal indicates one or more attendees. The control center 102 controls, according to the received specified signal, presentation of at least one type of the following information when the one or more attendees indicated by the specified signal serve as the speakers: speech video information, speech audio information and text information corresponding to the speech audio information.

In an embodiment, an attendee may input a keyword by using the terminal device 110, 140 or 160, so as to obtain text information that includes the keyword and corresponds to the speech audio information. Specifically, the control center 102 receives the keyword from the terminal device 110, 140 or 160, and controls presentation of text information that includes the keyword and corresponds to each segment of speech audio information.

In an embodiment, the control center 102 establishes a database as follows to store related information to implement functions in the foregoing three embodiments:

| Record ID | Start time | End time | Speaker ID | Text information |
|---|---|---|---|---|
| 1 | 5:12 | 6:21 | 2 | # like floating clouds and flowing water # |
| 2 | 11:22 | 11:58 | 1 | ###### |
| 3 | 12:36 | 13:25 | 2 | ## like floating clouds and flowing water |

Embodiment 3

Figure 3:
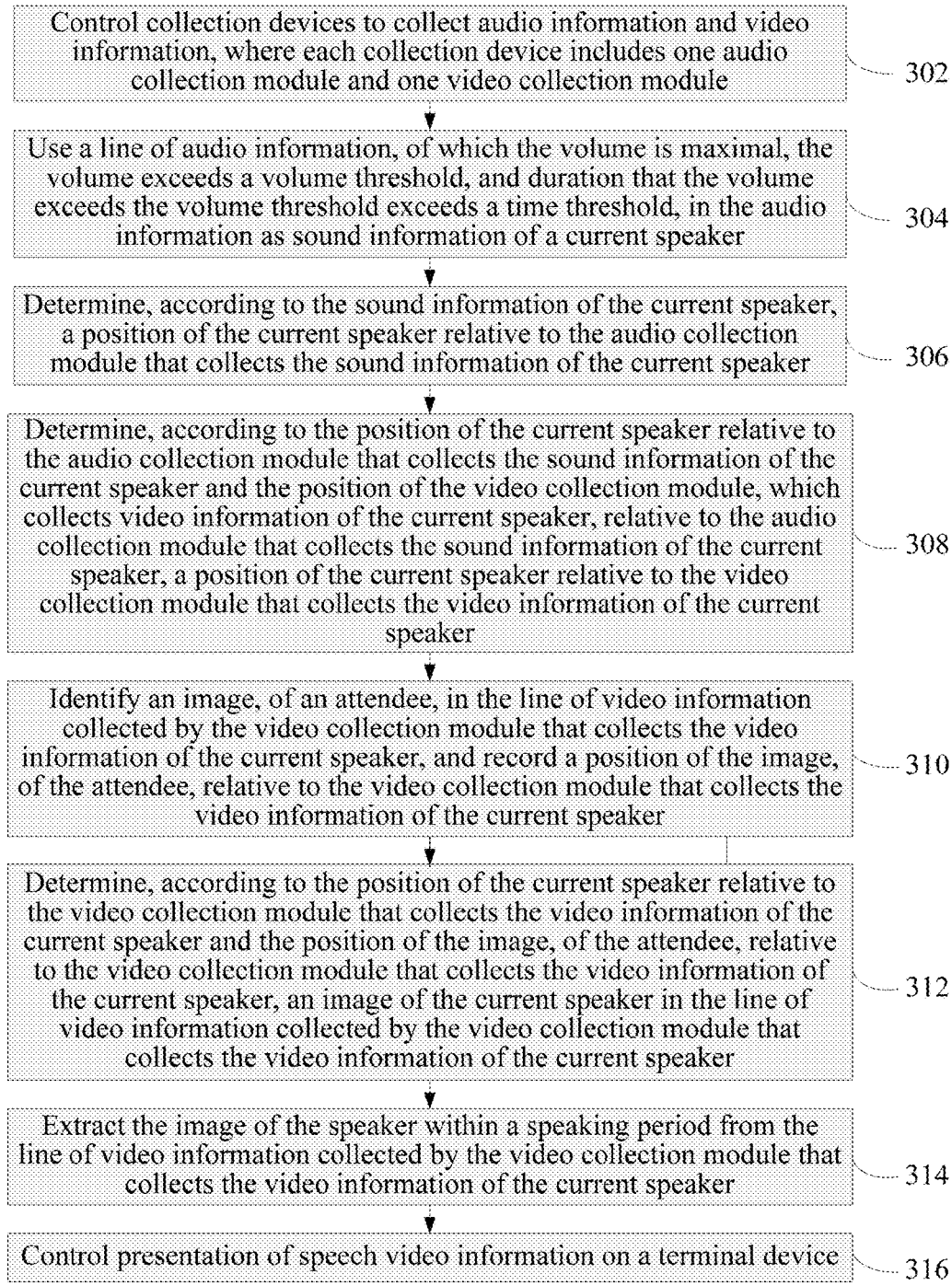
FIG. 3 is a schematic flowchart of a method for presenting communication information in video communication according to Embodiment 3 of the present invention.

FIG. 3 is a schematic flowchart of a method for presenting communication information in video communication according to a third embodiment of the present invention. The method may be used in the main site 104 in the first embodiment. The method includes:

In step S302, collection devices 112 and 114 are controlled to collect audio information and video information, and each collection device of the collection devices 112 and 114 includes one audio collection module and one video collection module. A position of the video collection module relative to the audio collection module is preset. The audio collection module in the collection device 112 collects audio information of attendees A and B. The audio information, of the attendees A and B, collected by the audio collection module in the collection device 112 constitutes a line of audio information in the audio information. The audio collection module in the collection device 114 collects audio information of attendees C and D. The audio information, of the attendees C and D, collected by the audio collection module in the collection device 114 constitutes another line of audio information in the audio information. The video collection module in the collection device 112 collects video information of the attendees A and B. The video information, of the attendees A and B, collected by the video collection module in collection device 112 constitutes a line of video information in the video information. The video collection module in the collection device 114 collects video information of the attendees C and D, and the video information, of the attendees C and D, collected by the video collection module in the collection device 114 constitutes another line of video information in the video information. In an embodiment, each audio collection module is one microphone array. Each microphone array at least includes two microphones.

Step S302 is equivalent to step S202 in Embodiment 2.

In step S304, a line of audio information, of which the volume is maximal, the volume exceeds a volume threshold, and duration that the volume exceeds the volume threshold exceeds a time threshold, in the audio information is used as sound information of a speaker.

In step S306, a position of the speaker relative to the audio collection module that collects the sound information of the speaker is determined according to the sound information of the speaker. In an embodiment, an algorithm for positioning a microphone array is used to determine the position of the speaker relative to the audio collection module that collects the sound information of the speaker. In an embodiment, for the algorithm for positioning a microphone array, reference may be made to R. O. Schmit, "Multiple emitter location and signal parameter estimation," IEEE Transactions on Antennas Propag., vol. 34 no. 3, pp. 276-280, March 1986.

Step S304 and step S306 are equivalent to step S204 in Embodiment 2.

In step S308, a position of the speaker relative to the video collection module that collects the video information of the speaker is determined according to the position of the speaker relative to the audio collection module that collects the sound information of the speaker and the position of the video collection module, which collects video information of the speaker, relative to the audio collection module that collects the sound information of the speaker.

In step S310, an image, of an attendee, in the line of video information collected by the video collection module that collects the video information of the speaker is identified, and a position of the image, of the attendee, relative to the video collection module that collects the video information of the speaker is recorded.

In step S312, an image of the speaker in the line of video information collected by the video collection module that collects the video information of the speaker is determined according to the position of the speaker relative to the video collection module that collects the video information of the speaker and the position of the image, of the attendee, relative to the video collection module that collects the video information of the speaker.

In step S314, the image of the speaker within a speaking period is extracted from the line of video information collected by the video collection module that collects the video information of the speaker. In an embodiment, a control center 102 may invoke a video cutout algorithm disclosed in Bai, Xue, et al. "Video snapcut: robust video object cutout using localized classifiers." ACM Transactions on Graphics (TOG). Vol. 28. No. 3. ACM, 2009 to keep the image of the speaker within the speaking period, and cut out a part other than the image of the speaker within the speaking period.

Steps S308, S310, S312, and S314 are equivalent to step S206 in Embodiment 2.

In step 316, presentation of speech video information on a terminal device (for example, a terminal device 110 in the main site 104, a terminal device 140 in a branch site 106 and/or a terminal device 160 in a branch site 108) is controlled.

Step S316 is equivalent to step S208 in Embodiment 2.

Figure 4:
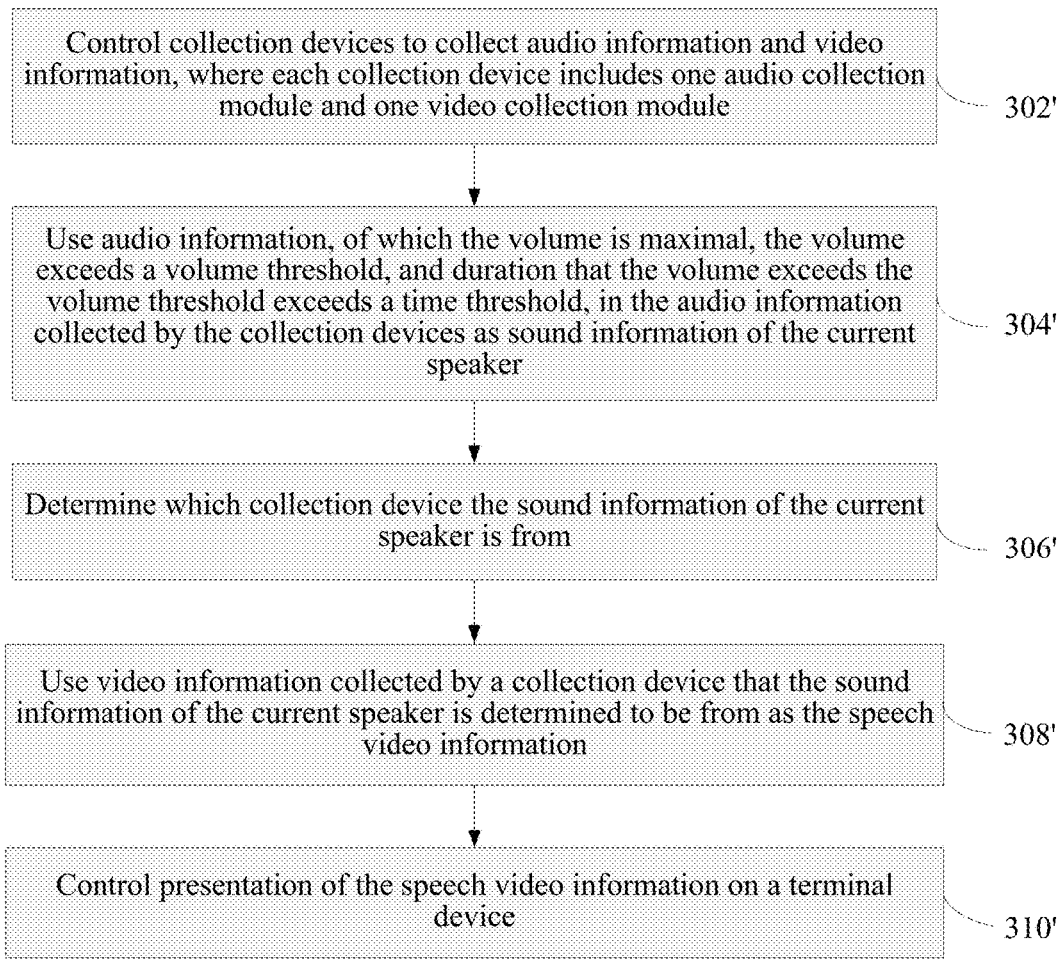
FIG. 4 is a schematic flowchart of another method for presenting communication information in video communication according to Embodiment 3 of the present invention.

As shown in FIG. 4, in an embodiment, the audio collection module and the video collection module in each collection device only collect audio information and video information of one attendee. If only the attendees A and C participate in video communication and neither of the attendees B and D participate in video communication, the collection device 112 only collects audio information and video information of the attendee A, and the collection device 114 only collects audio information and video information of the attendee C. In this embodiment, each audio collection module may be one microphone. A corresponding method for presenting communication information in video communication is:

In step S302', the collection devices 112 and 114 are controlled to collect the audio information and the video information, and each collection device in the collection devices 112 and 114 includes one audio collection module and one video collection module. A position of the video collection module relative to the audio collection module is preset. The audio collection module in the collection device 112 collects the audio information of the attendee A. The audio collection module in the collection device 114 collects the audio information of the attendee C. The video collection module in the collection device 112 collects the video information of the attendee A. The video collection module in the collection device 114 collects the video information of the attendee C.

Step S302' is equivalent to step S202 in Embodiment 2.

In step S304', audio information, of which the volume is maximal, the volume exceeds a volume threshold, and duration that the volume exceeds the volume threshold exceeds a time threshold, in the audio information collected by the collection devices 112 and 114 is used as sound information of the speaker.

In step S306', it is determined that the sound information of the speaker is from the collection device 112 or 114.

Step S304' and step S306' are equivalent to step S204 in Embodiment 2.

In step S308', if the sound information of the speaker is from the collection device 112, the video information collected by the collection device 112 is used as the speech video information. Similarly, if the sound information of the speaker is from the collection device 114, the video information collected by the collection device 114 is used as the speech video information.

Step S308' is equivalent to step S206 in Embodiment 2.

In step 310', presentation of the speech video information on a terminal device (for example, a terminal device 110 in the main site 104, a terminal device 140 in a branch site 106 and/or a terminal device 160 in a branch site 108) is controlled.

Step S310' is equivalent to step S208 in Embodiment 2.

Embodiment 4

Figure 5:
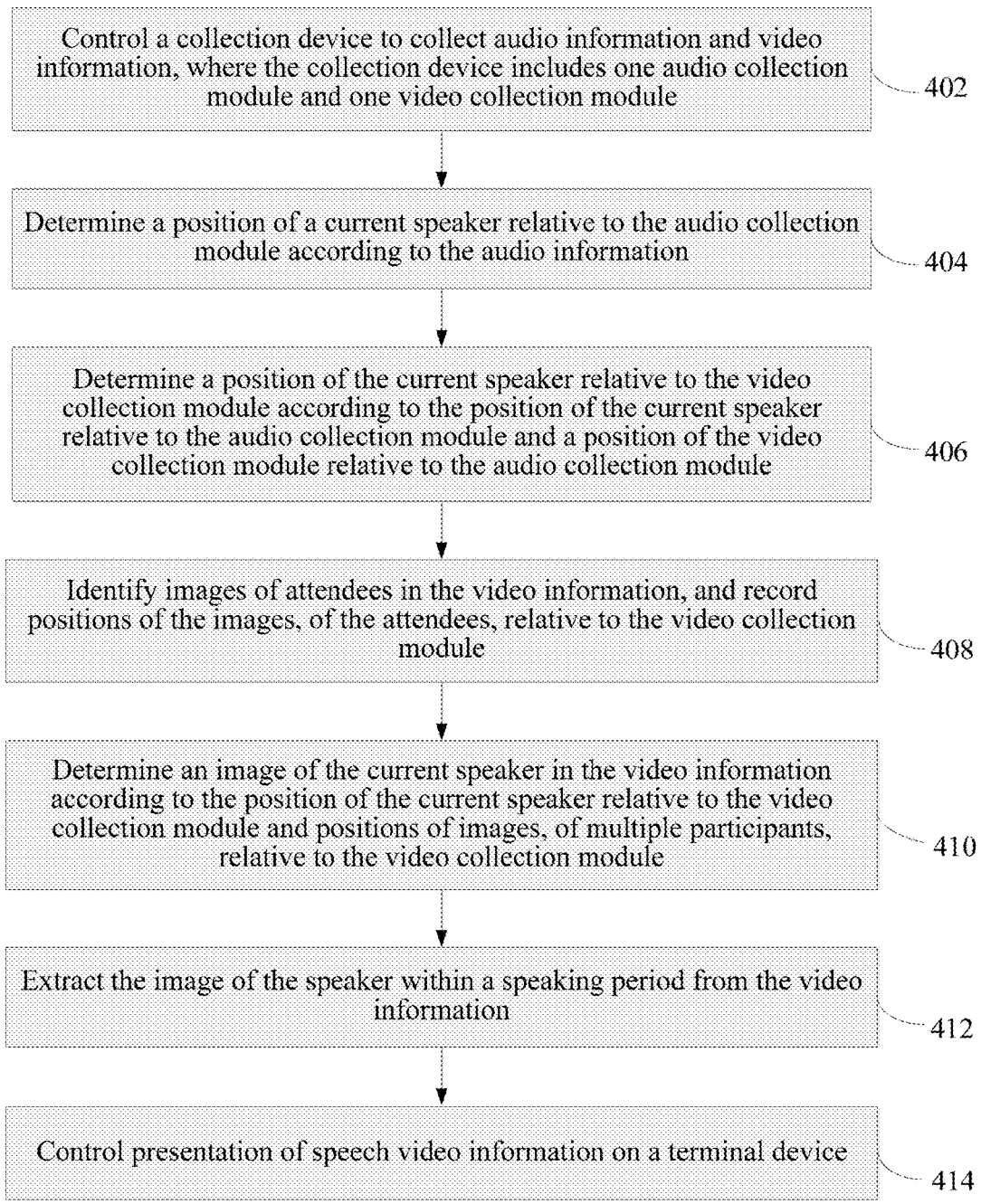
FIG. 5 is a schematic flowchart of a method for presenting communication information in video communication according to Embodiment 4 of the present invention.

FIG. 5 is a schematic flowchart of a method for presenting communication information in video communication according to a fourth embodiment of the present invention. The method may be used in the branch site 106 in the first embodiment. The method includes:

In step S402, one collection device 142 is controlled to collect audio information and video information. The collection device 142 includes one audio collection module and one video collection module. A position of the audio collection module relative to the video collection module is preset. The audio collection module collects the audio information, and the audio information includes audio information of attendees F and H. In an embodiment, the audio collection module is a microphone array. The video collection module collects the video information. The video information includes video information of the attendees F and H.

Step S402 is equivalent to step S202 in Embodiment 2.

In step S404, a position of a speaker relative to the audio collection module is determined according to the audio information.

Step S404 is equivalent to step S204 in Embodiment 2.

In step S406, a position of the speaker relative to the video collection module is determined according to the position of the speaker relative to the audio collection module and a position of the video collection module relative to the audio collection module. In an embodiment, an algorithm for positioning a microphone array is used to determine the position of the speaker relative to the audio collection module that collects sound information of the speaker. In an embodiment, for the algorithm for positioning a microphone array, reference may be made to R. O. Schmit, "Multiple emitter location and signal parameter estimation," IEEE Transactions on Antennas Propag., vol. 34 no. 3, pp. 276-280, March 1986.

In step S408, images of the attendees F and H in the video information are identified, and positions of the images, of the attendees F and H, relative to the video collection module are recorded.

In step S410, an image of the speaker in the video information is determined according to the position of the speaker relative to the video collection module and positions of images, of multiple participants, relative to the video collection module.

In step S412, the image of the speaker within a speaking period is extracted from the video information. In an embodiment, a control center 102 may invoke a video cutout algorithm disclosed in Bai, Xue, et al. "Video snapcut: robust video object cutout using localized classifiers." ACM Transactions on Graphics (TOG). Vol. 28. No. 3. ACM, 2009 to keep the image of the speaker within the speaking period, and cut out a part other than the image of the speaker within the speaking period.

Step S406, S408, S410, and S412 are equivalent to step S206 in Embodiment 2.

In step S414, the control center 102 controls presentation of speech video information on a terminal device (for example, a terminal device 110 in a main site 104, a terminal device 140 in the branch site 106 and/or a terminal device 160 in a branch site 108).

Step S414 is equivalent to step S208 in Embodiment 2.

Embodiment 5

Figure 6:
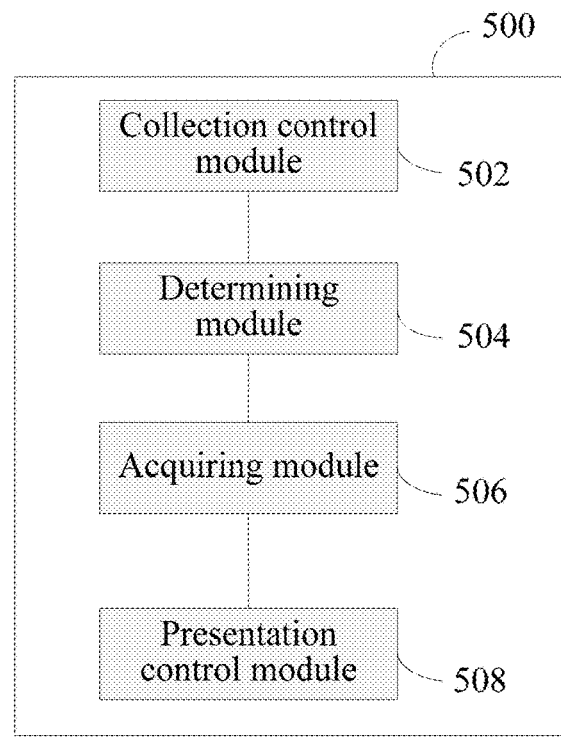
FIG. 6 is a schematic structural diagram of an apparatus for presenting communication information in video communication according to Embodiment 5 of the present invention.

FIG. 6 is a schematic structural diagram of an apparatus for presenting communication information in video communication 500 according to a fifth embodiment of the present invention.

The apparatus includes a collection control module 502, a determining module 504, an acquiring module 506, and a presentation control module 508. The collection control module 502 is configured to control one or more collection devices to collect audio information and video information of a video communication site. The determining module 504 is configured to determine a position of a speaker in the video communication site according to the audio information. The speaker is a person of participants in the video communication site that speaks. The acquiring module 506 is configured to acquire speech video information from the video information according to the position of the speaker. The speech video information is video information of the speaker within a speaking period. The presentation control module 508 is configured to control presentation of the speech video information.

In an embodiment, the presentation control module 508 controls real-time presentation of the speech video information.

Figure 7:
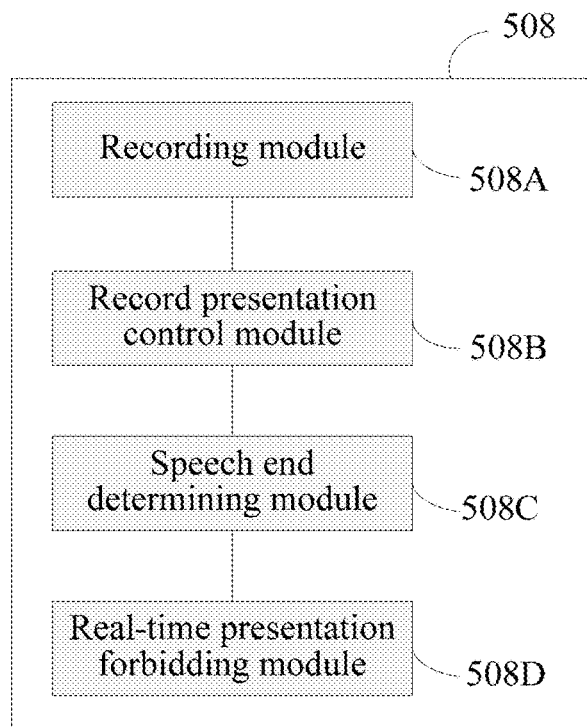
FIG. 7 is a schematic structural diagram of a presentation control module in Embodiment 5 of the present invention.

In another embodiment, as shown in FIG. 7, the presentation control module 508 includes a recording module 508A and a record presentation control module 508B. The recording module 508A records the speech video information. The record presentation control module 508B controls presentation of the recorded speech video information after the speaking period expires. In an embodiment, the presentation control module 508 further includes a speech end determining module 508C. The speech end determining module 508C determines, in a case in which the volume of the speaker is lower than a minimum-volume threshold, and duration that the volume of the speaker is lower than the minimum-volume threshold is longer than a maximum-time threshold, that the speaking period expires; or determine, in a case in which a speech end signal is received, that the speaking period expires.

Figure 8:
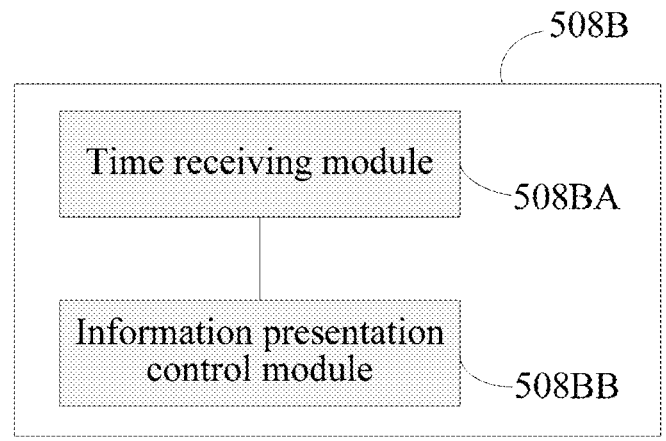
FIG. 8 is a schematic structural diagram of a record presentation control module in the presentation control module in Embodiment 5 of the present invention.

In an embodiment, the recording module 508A further generates a record icon corresponding to the speech video information, and the record presentation control module 508B further controls, according to a received signal indicating whether the record icon is touched, start or stop of playback of the speech video information. In an embodiment, the record presentation control module 508B further controls, according to the received signal indicating whether the record icon is touched, start or stop of playback of at least one type of information in the following information: speech audio information and text information corresponding to the speech audio information. The speech audio information is audio information within the speaking period in the audio information. In another embodiment, as shown in FIG. 8, the record presentation control module 508B includes: a time receiving module 508BA and an information presentation control module 508BB. The time receiving module 508BA receives indication information. The indication information is used to indicate a time range. The information present control module 508BB controls presentation of at least one type of the following received information within the time range: speech video information, speech audio information and text information corresponding to the speech audio information. The speech audio information is audio information within the speaking period in the audio information.

In an embodiment, the presentation control module 508 further includes a real-time presentation forbidding module 508D. The real-time presentation forbidding module 508D forbids real-time presentation of the speech audio information and the speech video information. The speech audio information is audio information within the speaking period in the audio information.

Embodiment 6

Figure 9:
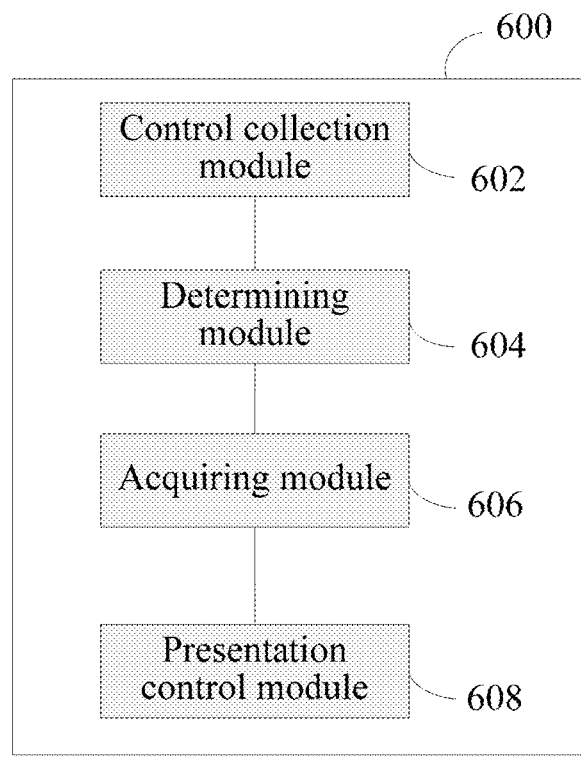
FIG. 9 is a schematic structural diagram of an apparatus for presenting communication information in video communication according to Embodiment 6 of the present invention.

FIG. 9 is a schematic structural diagram of an apparatus 600 for presenting communication information in video communication according to a sixth embodiment of the present invention.

The apparatus includes a collection control module 602, a determining module 604, an acquiring module 606, and a presentation control module 608. The collection control module 602 is configured to control collection of audio information and video information of a video communication site. Specifically, the collection control module 602 is configured to control multiple collection devices to collect the audio information and video information. Each collection device of the multiple collection devices includes one audio collection module and one video collection module. In an embodiment, the audio collection module is a microphone array. The microphone array includes at least two microphones. A position of the video collection module relative to the audio collection module is preset. The audio collection module collects audio information of one or more participants in multiple participants. The video collection module collects video information of the one or more participants. The audio information of the one or more participants collected by the audio collection module constitutes a line of audio information in the audio information. The video information of the one or more participants collected by the video collection module constitutes a line of video information in the video information.

Figure 10:
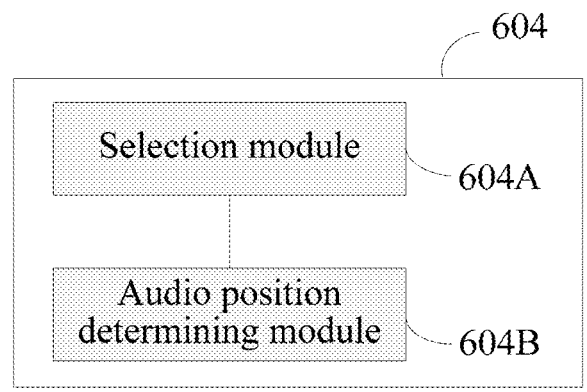
FIG. 10 is a schematic structural diagram of a determining module in Embodiment 6 of the present invention.

The determining module 604 is configured to determine a position of a speaker in the video communication site according to the audio information. Specifically, as shown in FIG. 10, the determining module 604 includes a selection module 604A and an audio position determining module 604B. The selection module 604A is configured to use a line of audio information, of which the volume is maximal, the volume exceeds a volume threshold, and duration that the volume exceeds the volume threshold exceeds a time threshold, in the audio information as sound information of the speaker. The audio position determining module 604B is configured to determine, according to the sound information of the speaker, a position of the speaker relative to the audio collection module that collects the sound information of the speaker.

Figure 11:
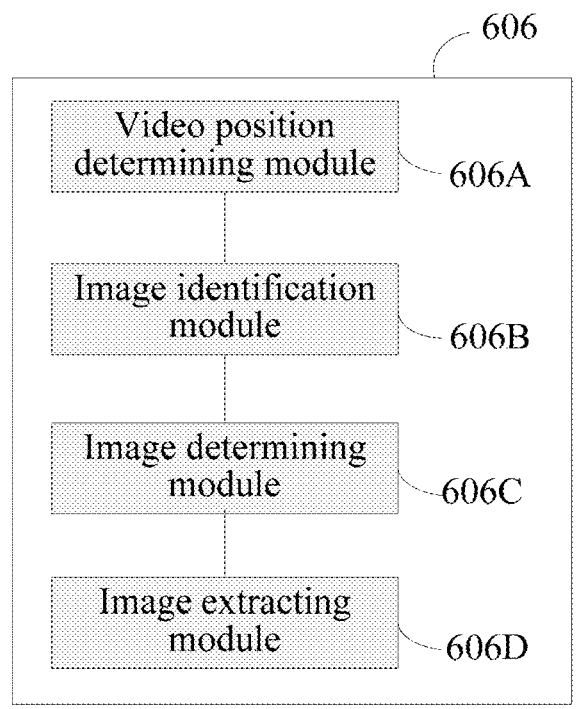
FIG. 11 is a schematic structural diagram of an acquiring module in Embodiment 6 of the present invention.

The acquiring module 606 is configured to acquire speech video information from the video information according to the position of the speaker. Specifically, as shown in FIG. 11, the acquiring module 606 includes a video position determining module 606A, an image identification module 606B, an image determining module 606C, and an image extracting module 606D. The video position determining module 606A is configured to determine, according to the position of the speaker relative to the audio collection module that collects the sound information of the speaker and the position of the video collection module, which collects video information of the speaker, relative to the audio collection module that collects the sound information of the speaker, a position of the speaker relative to the video collection module that collects the video information of the speaker. The image identification module 606B is configured to identify images, of the one or more participants, in the line of video information collected by the video collection module that collects the video information of the speaker, and record positions of the images, of the one or more participants, relative to the video collection module that collects the video information of the speaker. The image determining module 606C is configured to determine, according to the position of the speaker relative to the video collection module that collects the video information of the speaker and the positions of the images, of the one or more participants, relative to the video collection module that collects the video information of the speaker, an image of the speaker in the line of video information collected by the video collection module that collects the video information of the speaker. The image extracting module 606D is configured to extract, from the line of video information collected by the video collection module that collects the video information of the speaker, the image of the speaker within a speaking period.

The presentation control module 608 is configured to control presentation of the speech video information.

Embodiment 7

Figure 12:
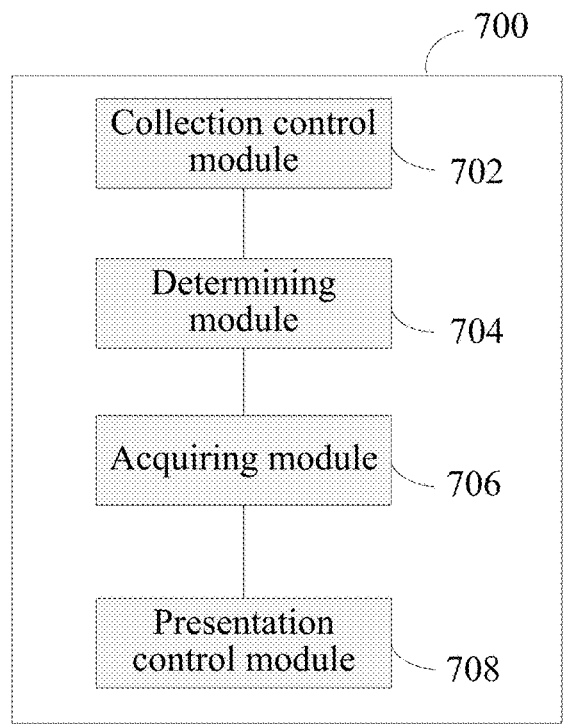
FIG. 12 is a schematic structural diagram of an apparatus for presenting communication information in video communication according to Embodiment 7 of the present invention.

FIG. 12 is a schematic structural diagram 700 of an apparatus for presenting communication information in video communication according to a seventh embodiment of the present invention.

The apparatus includes a collection control module 702, a determining module 704, an acquiring module 706, and a presentation control module 708. Specifically, the collection control module 702 controls one collection device to collect audio information and video information. One collection device includes one audio collection module configured to collect audio information of a video communication site and one video collection module configured to collect images of participants in the video communication site. a position of the audio collection module relative to the video collection module is preset. In an embodiment, the audio collection module is a microphone array. The microphone array includes at least two microphones.

The determining module 704 determines a position of a speaker relative to the audio collection module according to the audio information.

Figure 13:
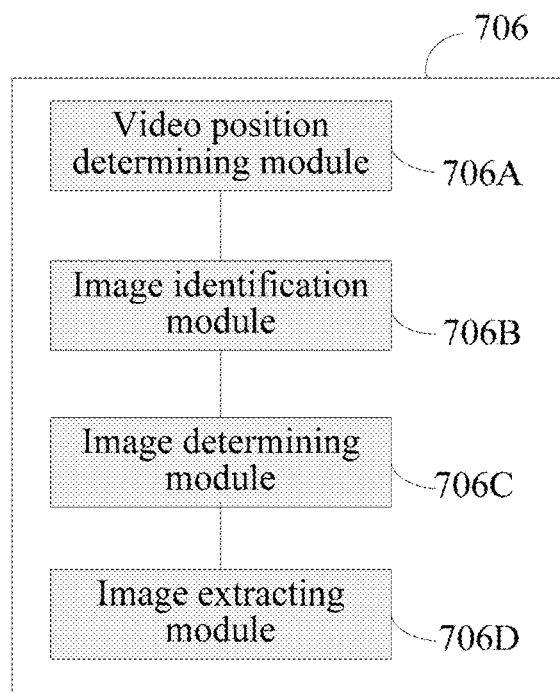
FIG. 13 is a schematic structural diagram of an acquiring module in Embodiment 7 of the present invention.

As shown in FIG. 13, the acquiring module 706 includes: a video position determining module 706A, an image identification module 706B, an image determining module 706C, and an image extracting module 706D. The video position determining module 706A determines, according to the position of the speaker relative to the audio collection module and a position of the video collection module relative to the audio collection module, a position of the speaker relative to the video collection module. The image identification module 706B identifies the images of the participants in the video information, and records positions of the images of the participants relative to the video collection module. The image determining module 706C determines an image of the speaker in the video information according to the position of the speaker relative to the video collection module and positions of the images, of the multiple participants, relative to the video collection module. The image extracting module 706D extracts the image of the speaker within a speaking period from the video information.

Embodiment 8

Figure 14:
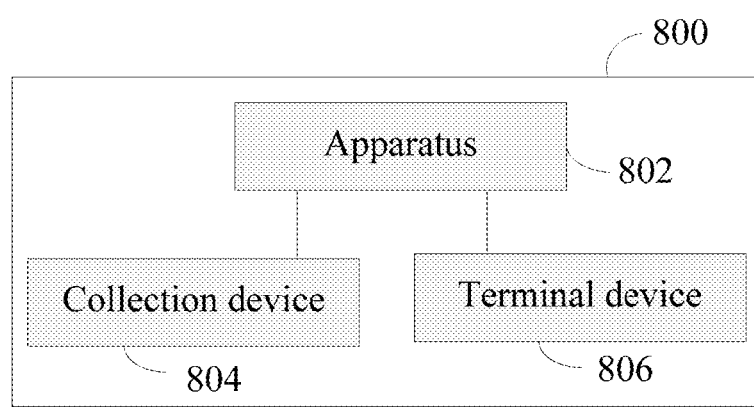
FIG. 14 is a schematic structural diagram of a system for presenting communication information in video communication according to Embodiment 8 of the present invention.

FIG. 14 is a schematic structural diagram 800 of a system for presenting communication information in video communication according to an eighth embodiment of the present invention. The system includes an apparatus 802 in any one embodiment in the fifth embodiment to the eighth embodiment, a collection device 804, and a terminal device 806. The collection device 804 collects audio information and video information under the control of the apparatus 802. The terminal device 806 presents speech video information under the control of the apparatus 802.

Embodiment 9

Figure 15:
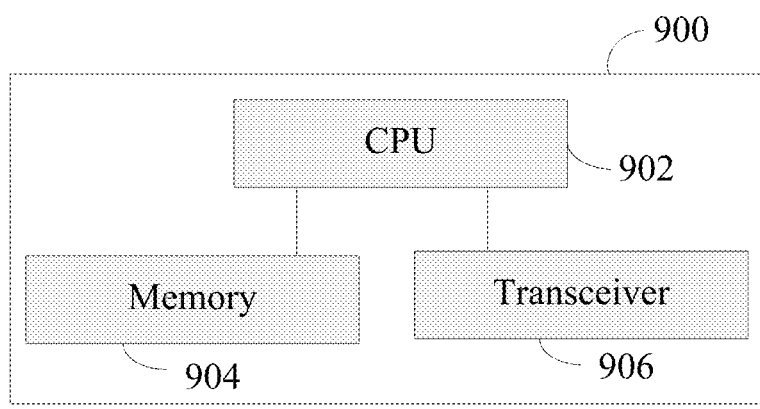
FIG. 15 is a schematic structural diagram of an apparatus for presenting communication information in video communication according to Embodiment 9 of the present invention.

FIG. 15 is a schematic structural diagram 900 of an apparatus for presenting communication information in video communication according to a ninth embodiment of the present invention. This embodiment is described with reference to Embodiments 1 to 8.

In this embodiment, the apparatus include a CPU (Central Processing Unit, central processing unit) 902, a memory 904, and a transceiver 906. The memory 904 is configured to store an instruction. The transceiver 906 is configured to receive an input signal. The CPU 902 is configured to control collection of audio information and video information in a video communication site (for example, a main site 104, and branch sites 106 and/or 108), determine a position of a speaker in the video communication site according to the collected audio information, where the speaker is a person of participants in the video communication site that speaks, then acquire speech video information from the collected video information according to the position of the speaker, where the speech video information is video information of the speaker within a speaking period; and finally control presentation of the speech video information on a terminal device (for example, a terminal device 110 in the main site 104, a terminal device 140 in the branch site 106 and/or a terminal device 160 in the branch site 108).

In an embodiment, the CPU 902 controls real-time presentation of the speech video information on the terminal devices 110, 140, and/or 160. For example, when an attendee C in the main site 104 is the speaker, a control center 102 controls real-time presentation of a part of speech video information, which includes an image of the attendee C, on the terminal devices 110, 140, and/or 160.

In another embodiment, the CPU 902 controls recording of the speech video information, and controls presentation of the recorded speech video information on the terminal devices 110, 140, and/or 160 after the speaking period expires. Specifically, the CPU 902 records the speech video information, generates a record icon corresponding to the speech video information, and after the speaking period expires, controls, according to a signal indicating whether the record icon is touched received by the transceiver 906, start or stop of playback of the speech video information corresponding to the record icon. Furthermore, in an embodiment, the CPU 902 further controls, according to the signal indicating whether the record icon is touched received by the transceiver 906, start or stop of playback of at least one type of information in the following information: the speech video information corresponding to the record icon, speech audio information, and text information corresponding to the speech audio information. The speech audio information is audio information within the speaking period in the collected audio information in the video communication site. The text information is, for example, a text record of the speech audio information. Therefore, an attendee may reexamine content of video communication.

In an embodiment, a manner for determining that the speaking period expires is: if the volume of the speaker is lower than a minimum-volume threshold, and duration that the volume of the speaker is lower than the minimum-volume threshold is longer than a maximum-time threshold, determining that the speaking period expires; or if a speech end signal, for example, a speech end signal from the transceiver 906, is received, determining that the speaking period expires.

In an embodiment, in a process that another attendee speaks, the speaker may perform an operation on the terminal device 110, 140 or 160 to turn on a silent speech mode. In the silent speech mode, within the speaking period that the speaker speaks, the transceiver 906 forbids real-time presentation of the speech audio information and speech video information of the speaker on each terminal device. The speech audio information is audio information within the speaking period in the collected audio information in the video communication site. Specifically, in an embodiment, the speaker performs an operation on a terminal device to turn on the silent speech mode and starts to speak. After accepting the operation of the speaker to turn on the silent speech mode, the terminal device sends a silent speech mode turn-on signal to the transceiver 906. The CPU 902 forbids, according to the silent speech mode turn-on signal received by the transceiver 906, real-time presentation of the speech audio information and speech video information of the speaker on each terminal device, and at the same time controls a collection device, which collects sound information of the speaker, to record a speech of the speaker. After the speech ends, the speaker performs an operation on the terminal device 110, 140 or 160 to turn off the silent speech mode. After accepting the operation of the speaker to turn off the silent speech mode, the terminal device sends a silent speech mode turn-off signal to the transceiver 906. The CPU 902 generates a record icon according to the silent speech mode turn-off signal received by the transceiver 906, so that an attendee may control, by touching the record icon, playback of the recorded speech of the speaker in the silent speech mode.

In an embodiment, on an information transmission path between each collection device in collection devices 112, 114, 120, 142, and 160 and the apparatus, a switch is set, so that when the switch is closed, the information transmission path is connected, and under the control of the CPU 902, the video information and audio information collected by the collection device may be uploaded to the transceiver 906, and when the switch is opened, the information transmission path is disconnected, and the video information and audio information collected by the collection device cannot be uploaded to the transceiver 906. The switch is controlled by a silent speech mode signal. When the silent speech mode is turned on, under the control of the silent speech mode signal, within the speaking period that the speaker speaks, the switch is opened, the video information and audio information collected by the collection device cannot be uploaded to the transceiver 906, and the local collection device records the collected video information and audio information. After the silent speech mode is turned off, when the switch is closed, the recorded video information and audio information are uploaded to the transceiver 906, and the video information and audio information collected by the collection device may be uploaded to the transceiver 906. Therefore, the speaker may record speech of the speaker without interrupting a speech of another attendee that speaks, and each attendee may reexamine, after a speech of the attendee ends, the speech of the attendee by operating a corresponding record icon.

In an embodiment, an attendee may input a time range by using the terminal device 110, 140 or 160, and input a corresponding command to obtain information in video communication within the time range. Specifically, the CPU 902 records the speech video information. The transceiver 906 receives the time range sent from the terminal device 110, 140 or 160. The CPU 902 controls presentation of at least one type of the following received information within the time range: speech video information, speech audio information and text information corresponding to the speech audio information.

In an embodiment, an attendee may input a specified signal by using the terminal device 110, 140 or 160 to obtain information, of an attendee in video communication, indicated by the specified signal. Specifically, after the speaking period expires, the transceiver 906 receives the specified signal from the terminal device 110, 140 or 160. The specified signal indicates one or more attendees. The CPU 902 controls, according to the specified signal received by the transceiver 906, presentation of at least one type of the following information when the one or more attendees indicated by the specified signal serve as the speakers: speech video information, speech audio information and text information corresponding to the speech audio information.

In an embodiment, an attendee may input a keyword by using the terminal device 110, 140 or 160, so as to obtain text information that includes the keyword and corresponds to the speech audio information. Specifically, the transceiver 906 receives the keyword from the terminal device 110, 140 or 160, and the CPU 902 controls presentation of text information that includes the keyword and corresponds to each segment of speech audio information.

In an embodiment, the CPU 902 establishes a database in the memory 904 to store related information to implement functions in the foregoing three embodiments:

| Record ID | Start time | End time | Speaker ID | Text information |
|---|---|---|---|---|
| 1 | 5:12 | 6:21 | 2 | # like floating clouds and flowing water # |
| 2 | 11:22 | 11:58 | 1 | ###### |
| 3 | 12:36 | 13:25 | 2 | ## like floating clouds and flowing water |

In an embodiment, the CPU 902 controls the collection devices 112 and 114 to collect audio information and the video information, and each collection device in the collection devices 112 and 114 includes one audio collection module and one video collection module. A position of the video collection module relative to the audio collection module is preset. The audio collection module in the collection device 112 collects audio information of attendees A and B. The audio information, of the attendees A and B, collected by the audio collection module in the collection device 112 constitutes a line of audio information in the audio information. The audio collection module in the collection device 114 collects audio information of attendees C and D. The audio information, of the attendees C and D, collected by the audio collection module in the collection device 114 constitutes another line of audio information in the audio information. The video collection module in the collection device 112 collects video information of the attendees A and B. The video information, of the attendees A and B, collected by the video collection module in the collection device 112 constitutes a line of video information in the video information. The video collection module in the collection device 114 collects video information of the attendees C and D, and the video information, of the attendees C and D, collected by the video collection module in the collection device 114 constitutes another line of video information in the video information. In an embodiment, each audio collection module is one microphone array. Each microphone array at least includes two microphones.

The CPU 902 uses a line of audio information, of which the volume is maximal, the volume exceeds a volume threshold, and duration that the volume exceeds the volume threshold exceeds a time threshold, in the audio information as sound information of the speaker.

The CPU 902 determines, according to the sound information of the speaker, a position of the speaker relative to the audio collection module that collects the sound information of the speaker. In an embodiment, an algorithm for positioning a microphone array is used to determine the position of the speaker relative to the audio collection module that collects the sound information of the speaker. In an embodiment, for the algorithm for positioning a microphone array, reference may be made to R. O. Schmit, "Multiple emitter location and signal parameter estimation," IEEE Transactions on Antennas Propag., vol. 34 no. 3, pp. 276-280, March 1986.

The CPU 902 determines, according to the position of the speaker relative to the audio collection module that collects the sound information of the speaker and the position of the video collection module, which collects video information of the speaker, relative to the audio collection module that collects the sound information of the speaker, a position of the speaker relative to the video collection module that collects the video information of the speaker.

The CPU 902 identifies, an image, of an attendee, in the line of video information collected by the video collection module that collects the video information of the speaker, and records a position of the image, of the attendee, relative to the video collection module that collects the video information of the speaker.

The CPU 902 determines, according to the position of the speaker relative to the video collection module that collects the video information of the speaker and the position of the image, of the attendee, relative to the video collection module that collects the video information of the speaker, an image of the speaker in the line of video information collected by the video collection module that collects the video information of the speaker.

The CPU 902 extracts, from the line of video information collected by the video collection module that collects the video information of the speaker, the image of the speaker within the speaking period. In an embodiment, a control center 102 may invoke a video cutout algorithm disclosed in Bai, Xue, et al. "Video snapcut: robust video object cutout using localized classifiers." ACM Transactions on Graphics (TOG). Vol. 28. No. 3. ACM, 2009 to keep the image of the speaker within the speaking period, and cut out a part other than the image of the speaker within the speaking period.

The CPU 902 controls presentation of the speech video information on a terminal device (for example, a terminal device 110 in the main site 104, a terminal device 140 in the branch site 106 and/or a terminal device 160 in the branch site 108).

In another embodiment, the audio collection module and the video collection module in each collection device only collect audio information and video information of one attendee. If only the attendees A and C participate in video communication and neither of the attendees B and D participate in video communication, the collection device 112 only collects audio information and video information of the attendee A, and the collection device 114 only collects audio information and video information of the attendee C. In this embodiment, each audio collection module may be one microphone.

The CPU 902 controls the collection devices 112 and 114 to collect the audio information and the video information, and each collection device in the collection devices 112 and 114 includes one audio collection module and one video collection module. A position of the video collection module relative to the audio collection module is preset. The audio collection module in the collection device 112 collects the audio information of the attendee A. The audio collection module in the collection device 114 collects the audio information of the attendee C. The video collection module in the collection device 112 collects the video information of the attendee A. The video collection module in the collection device 114 collects the video information of the attendee C.

The CPU 902 uses audio information, of which the volume is maximal, the volume exceeds a volume threshold, and duration that the volume exceeds the volume threshold exceeds a time threshold, in the audio information collected by the collection devices 112 and 114 as sound information of the speaker.

The CPU 902 determines that the sound information of the speaker is from the collection device 112 or 114.

The CPU 902 uses, if the sound information of the speaker is from the collection device 112, the video information collected by the collection device 112 as the speech video information, and similarly, uses, if the sound information of the speaker is from the collection device 114, the video information collected by the collection device 114 as the speech video information.

The CPU 902 controls presentation of the speech video information on a terminal device (for example, a terminal device 110 in the main site 104, a terminal device 140 in the branch site 106 and/or a terminal device 160 in the branch site 108).

In an embodiment, the CPU 902 controls one collection device 142 to collect audio information and the video information. The collection device 142 includes one audio collection module and one video collection module. A position of the audio collection module relative to the video collection module is preset. The audio collection module collects the audio information, and the audio information includes audio information of attendees F and H. In an embodiment, the audio collection module is a microphone array. The video collection module collects the video information. The video information includes video information of the attendees F and H.

The CPU 902 determines a position of the speaker relative to the audio collection module according to the audio information.

The CPU 902 determines a position of the speaker relative to the video collection module according to the position of the speaker relative to the audio collection module and the position of the video collection module relative to the audio collection module. In an embodiment, an algorithm for positioning a microphone array is used to determine the position of the speaker relative to the audio collection module that collects sound information of the speaker. In an embodiment, for the algorithm for positioning a microphone array, reference may be made to R. O. Schmit, "Multiple emitter location and signal parameter estimation," IEEE Transactions on Antennas Propag., vol. 34 no. 3, pp. 276-280, March 1986.

The CPU 902 identifies images of the attendees F and H in the video information, and records positions of the images, of the attendees F and H, relative to the video collection module.

The CPU 902 determines an image of the speaker in the video information according to the position of the speaker relative to the video collection module and positions of images, of multiple participants, relative to the video collection module.

The CPU 902 extracts the image of the speaker within the speaking period from the video information. In an embodiment, the control center 102 may invoke a video cutout algorithm disclosed in Bai, Xue, et al. "Video snapcut: robust video object cutout using localized classifiers." ACM Transactions on Graphics (TOG). Vol. 28. No. 3. ACM, 2009 to keep the image of the speaker within the speaking period, and cut out a part other than the image of the speaker within the speaking period.

The CPU 902 controls presentation of the speech video information on a terminal device (for example, a terminal device 110 in the main site 104, a terminal device 140 in the branch site 106 and/or a terminal device 160 in the branch site 108).

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

The foregoing are only exemplary embodiments of the present invention which are not intended to limit the claims of the present invention. Equivalent variations made on the basis of the claims of the present invention shall fall within the scope of the present invention.

What is claimed is:

1. A method for presenting communication information in video communication, comprising:
    controlling a collection of audio information and video information of a video communication site;
    determining a position of a speaker in the video communication site according to the audio information, wherein the speaker is a person in a group of participants in the video communication;
    acquiring speech video information from the video information according to the position of the speaker, wherein the speech video information is video information of the speaker within a speaking period; and
    controlling presentation of the speech video information by forbidding real-time presentation of the speech video information and speech audio information of the speaker to all participants when a silent mode is activated, recording of the speech video information, and controlling presentation of the recorded speech video information after the speaking period expires, wherein the speech audio information is audio information within the speaking period in the audio information.

2. The method according to claim 1, wherein:
    the controlling the collection of audio information and video information of the video communication site comprises
    controlling multiple collection devices to collect the audio information and the video information, wherein:
        each of the multiple collection devices comprises an audio collection component and a video collection component,
        a position of the video collection component relative to the audio collection component is preset,
        the audio collection component collects audio information of one or more participants in the group of participants,
        the video collection component collects video information of the one or more participants,
        the audio information of the one or more participants constitutes a line of audio information in the audio information, and
        the video information of the one or more participants constitutes a line of video information in the video information;
    the determining the position of the speaker in the video communication site according to the audio information comprises:
        using the line of audio information, of which a volume is maximal, the volume exceeds a volume threshold, and a duration that the volume exceeds the volume threshold exceeds a time threshold, in the audio information as sound information of the speaker, and
        determining, according to the sound information of the speaker, a position of the speaker relative to the audio collection component; and
    the acquiring speech video information from the video information according to the position of the speaker comprises:
        determining, according to the position of the speaker relative to the audio collection component and the position of the video collection component relative to the audio collection component, a position of the speaker relative to the video collection component,
        identifying images of the one or more participants in the line of video information collected by the video collection component, and recording positions of the images of the one or more participants relative to the video collection component,
        determining, according to the position of the speaker relative to the video collection component and the positions of the images of the one or more participants relative to the video collection component, an image of the speaker in the line of video information collected by the video collection component, and
        extracting, from the line of video information collected by the video collection component, the image of the speaker within the speaking period.

3. The method according to claim 1, wherein:
    the controlling the collection of audio information and video information of the video communication site comprises
    controlling a collection device to collect the audio information and the video information, wherein:
        the collection device comprises an audio collection component and a video collection component,
        a position of the audio collection component relative to the video collection component is preset,
        the audio collection component collects the audio information,
        the audio information is audio information of the group of participants,
        the video collection component collects the video information, and
        the video information is video information of the group of participants;
    the determining the position of the speaker in the video communication site according to the audio information comprises: determining a position of the speaker relative to the audio collection component according to the audio information; and the acquiring speech video information from the video information according to the position of the speaker comprises:
  determining, according to the position of the speaker relative to the audio collection component and a position of the video collection component relative to the audio collection component, a position of the speaker relative to the video collection component,
  identifying images of the group of participants in the video information, and recording positions of the images relative to the video collection component,
  determining, according to the position of the speaker relative to the video collection component and the positions of the images relative to the video collection component, an image of the speaker in the video information, and
  extracting the image of the speaker within the speaking period from the video information.

4. The method according to claim 2, wherein the audio collection component is a microphone array comprising at least two microphones.

5. The method according to claim 1, wherein the controlling presentation of the speech video information comprises: controlling real-time presentation of the speech video information.

6. The method according to claim 1, further comprising one of the following:
  when a volume of the speaker is lower than a minimum-volume threshold, and a duration that the volume of the speaker is lower than the minimum-volume threshold is longer than a maximum-time threshold, determining that the speaking period expires; and
  when a speech end signal is received, determining that the speaking period expires.

7. The method according to claim 1, wherein:
  the controlling presentation of the speech video information further comprises generating a record icon associated with the speech video information; and
  the controlling presentation of the recorded speech video information after the speaking period expires comprises controlling, according to a received signal indicating whether the record icon is touched, start or stop of playback of the speech video information.

8. The method according to claim 7, wherein the method further comprises:
  controlling, according to the received signal indicating whether the record icon is touched, start or stop of playback of at least one type of information, wherein the type of information comprises speech audio information and text information associated with the speech audio information, wherein the speech audio information is audio information within the speaking period in the audio information.

9. The method according to claim 1, wherein the controlling presentation of the speech video information comprises:
  controlling recording of the speech video information;
  receiving indication information, wherein the indication information is used to indicate a time range of speech video information to be played; and
  controlling presentation of the speech video information within the time range.

10. An apparatus for presenting communication information in video communication, comprising a processor and a non-transitory computer readable medium with instructions stored thereon such that when the instructions are executed by the processor, the processor is configured to:
  control one or more collection devices to collect audio information and video information of a video communication site;
  select a speaker in the video communication site according to the audio information or determine a position of the speaker in the video communication site according to the audio information or by using the collection device, wherein the speaker is a person in a group of participants in the video communication site;
  acquire speech video information from the video information according to the position of the speaker, wherein the speech video information is video information of the speaker within a speaking period; and
  control presentation of the speech video information by forbidding real-time presentation of the speech video information and speech audio information of the speaker to all participants when a silent mode is activated, recording of the speech video information, and controlling presentation of the recorded speech video information after the speaking period expires, wherein the speech audio information is audio information within the speaking period in the audio information.

11. The apparatus according to claim 10, further comprising:
  multiple collection devices, wherein each of the multiple collection devices comprises an audio collection component and a video collection component, a position of the video collection component relative to the audio collection component is preset, the audio collection component collects audio information of one or more participants in the group of participants, the video collection component collects video information of the one or more participants, the audio information of the one or more participants constitutes a line of audio information in the audio information, and the video information of the one or more participants constitutes a line of video information in the video information; and
  wherein the processor is further configured to:
    use the line of audio information, of which a volume is maximal, the volume exceeds a volume threshold, and a duration that the volume exceeds the volume threshold exceeds a time threshold, in the audio information as sound information of the speaker,
    determine, according to the sound information of the speaker, a position of the speaker relative to the audio collection component,
    determine, according to the position of the speaker relative to the audio collection component and the position of the video collection component relative to the audio collection component, a position of the speaker relative to the video collection component,
    identify images of the one or more participants, in the line of video information collected by the video collection component, and record positions of the images, of the one or more participants, relative to the video collection component,
    determine, according to the position of the speaker relative to the video collection component and the positions of the images of the one or more participants relative to the video collection component, an image of the speaker in the line of video information collected by the video collection component, and
    extract, from the line of video information collected by the video collection component, the image of the speaker within the speaking period.

12. The apparatus according to claim 10, wherein:
the collection device comprises an audio collection component configured to collect the audio information of the video communication site and a video collection component configured to collect images of the participants in the video communication site;
a position of the audio collection component relative to the video collection component is preset; and
the processor is further configured to:
determine a position of the speaker relative to the audio collection component according to the audio information,
determine, according to the position of the speaker relative to the audio collection component and a position of the video collection component relative to the audio collection component, a position of the speaker relative to the video collection component,
identify the images of the participants in the video information, and record positions of the images of the participants, relative to the video collection component,
determine, according to the position of the speaker relative to the video collection component and the positions of the images of the participants relative to the video collection component, an image of the speaker in the video information, and
extract the image of the speaker within the speaking period from the video information.

13. The apparatus according to claim 11, wherein the audio collection component is a microphone array comprising at least two microphones.

14. The apparatus according to claim 10, wherein the processor is configured to control real-time presentation of the speech video information.

15. The apparatus according to claim 10, wherein the processor is further configured to:
determine, in a case in which a volume of the speaker is lower than a minimum-volume threshold, and a duration that the volume of the speaker is lower than the minimum-volume threshold is longer than a maximum-time threshold, that the speaking period expires; or
determine, in a case in which a speech end signal is received, that the speaking period expires.

16. The apparatus according to claim 10, wherein the processor is further configured to:
generate a record icon associated with the speech video information; and
control, according to a received signal indicating whether the record icon is touched, start or stop of playback of the speech video information.

17. The apparatus according to claim 16, wherein the processor is further configured to control, according to the received signal indicating whether the record icon is touched, start or stop of playback of at least one type of information in the following information: speech audio information and text information corresponding to the speech audio information, wherein the speech audio information is audio information within the speaking period in the audio information.

18. The apparatus according to claim 10, wherein the processor is further configured to:
receive indication information, wherein the indication information is used to indicate a time range; and
control presentation, within the time range, of at least one type of the following information: the speech video information, speech audio information, and text information corresponding to the speech audio information, wherein the speech audio information is audio information within the speaking period in the audio information.

19. A system for presenting communication information in video communication, comprising:
the apparatus according to claim 10;
a collection device, configured to collect the audio information and the video information under the control of the apparatus; and
a terminal device, configured to present the speech video information under the control of the apparatus.

* * * * *